(12) United States Patent
Annamalai et al.

(10) Patent No.: US 11,256,505 B2
(45) Date of Patent: Feb. 22, 2022

(54) USING LOOP EXIT PREDICTION TO ACCELERATE OR SUPPRESS LOOP MODE OF A PROCESSOR

(71) Applicant: ADVANCED MICRO DEVICES, INC., Santa Clara, CA (US)

(72) Inventors: Arunachalam Annamalai, Santa Clara, CA (US); Marius Evers, Santa Clara, CA (US); Aparna Thyagarajan, Santa Clara, CA (US); Anthony Jarvis, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/169,053

(22) Filed: Feb. 5, 2021

(65) Prior Publication Data

US 2021/0191722 A1    Jun. 24, 2021

Related U.S. Application Data

(63) Continuation of application No. 16/134,440, filed on Sep. 18, 2018, now Pat. No. 10,915,322.

(51) Int. Cl.
*G06F 9/30* (2018.01)
*G06F 9/38* (2018.01)
*G06F 1/3296* (2019.01)

(52) U.S. Cl.
CPC ........ *G06F 9/30065* (2013.01); *G06F 1/3296* (2013.01); *G06F 9/3867* (2013.01)

(58) Field of Classification Search
None
See application file for complete search history.

(56) References Cited

U.S. PATENT DOCUMENTS

| 9,459,871 | B2 * | 10/2016 | Lipshits | G06F 9/30065 |
| 9,471,322 | B2 * | 10/2016 | Blasco | G06F 9/381 |
| 9,524,011 | B2 * | 12/2016 | Hall | G06F 9/3844 |
| 9,710,276 | B2 * | 7/2017 | Suggs | G06F 9/325 |
| 2015/0293577 | A1 | 10/2015 | Hall et al. | |

OTHER PUBLICATIONS

International Preliminary Report on Patentability for PCT/US2019/048487 dated Apr. 1, 2021, 10 pages.
Translation of Office Action dated Nov. 4, 2021 for Chinese Application No. 201980061096.3, 27 pages.

* cited by examiner

*Primary Examiner* — Michael Sun

(57) ABSTRACT

A processor predicts a number of loop iterations associated with a set of loop instructions. In response to the predicted number of loop iterations exceeding a first loop iteration threshold, the set of loop instructions are executed in a loop mode that includes placing at least one component of an instruction pipeline of the processor in a low-power mode or state and executing the set of loop instructions from a loop buffer. In response to the predicted number of loop iterations being less than or equal to a second loop iteration threshold, the set of instructions are executed in a non-loop mode that includes maintaining at least one component of the instruction pipeline in a powered up state and executing the set of loop instructions from an instruction fetch unit of the instruction pipeline.

20 Claims, 5 Drawing Sheets

USING LOOP EXIT PREDICTION TO ACCELERATE OR SUPPRESS LOOP MODE OF A PROCESSOR

CROSS-REFERENCE TO RELATED APPLICATIONS

The present application is a continuation application of U.S. patent application Ser. No. 16/134,440, entitled "Using Loop Prediction to Accelerate or Suppress Loop Mode of a Processor", and filed on Sep. 18, 2018, the entirety of which is incorporated by reference herein.

BACKGROUND

To enhance processing efficiency, modern processors sometimes employ a loop mode to execute program loops. In the loop mode, the processor retrieves and executes instructions of the loop from a loop instruction buffer, rather than repeatedly retrieving the instructions of the loop via an instruction fetch unit. The loop mode allows the processor to conserve resources by, for example, placing the instruction fetch unit or other portions of the processor in a low-power state while in the loop mode. However, conventional loop mode operation is inefficient under some conditions. For example, the loop mode is typically exited as a result of the processor encountering a branch misprediction for the loop exit instruction. The branch misprediction causes the instruction pipeline of the processor to be flushed thereby consuming additional processor resources and resulting in a power overhead. For relatively short instruction loops, the resources consumed by the pipeline flush can exceed the resources conserved by operating in the loop mode.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
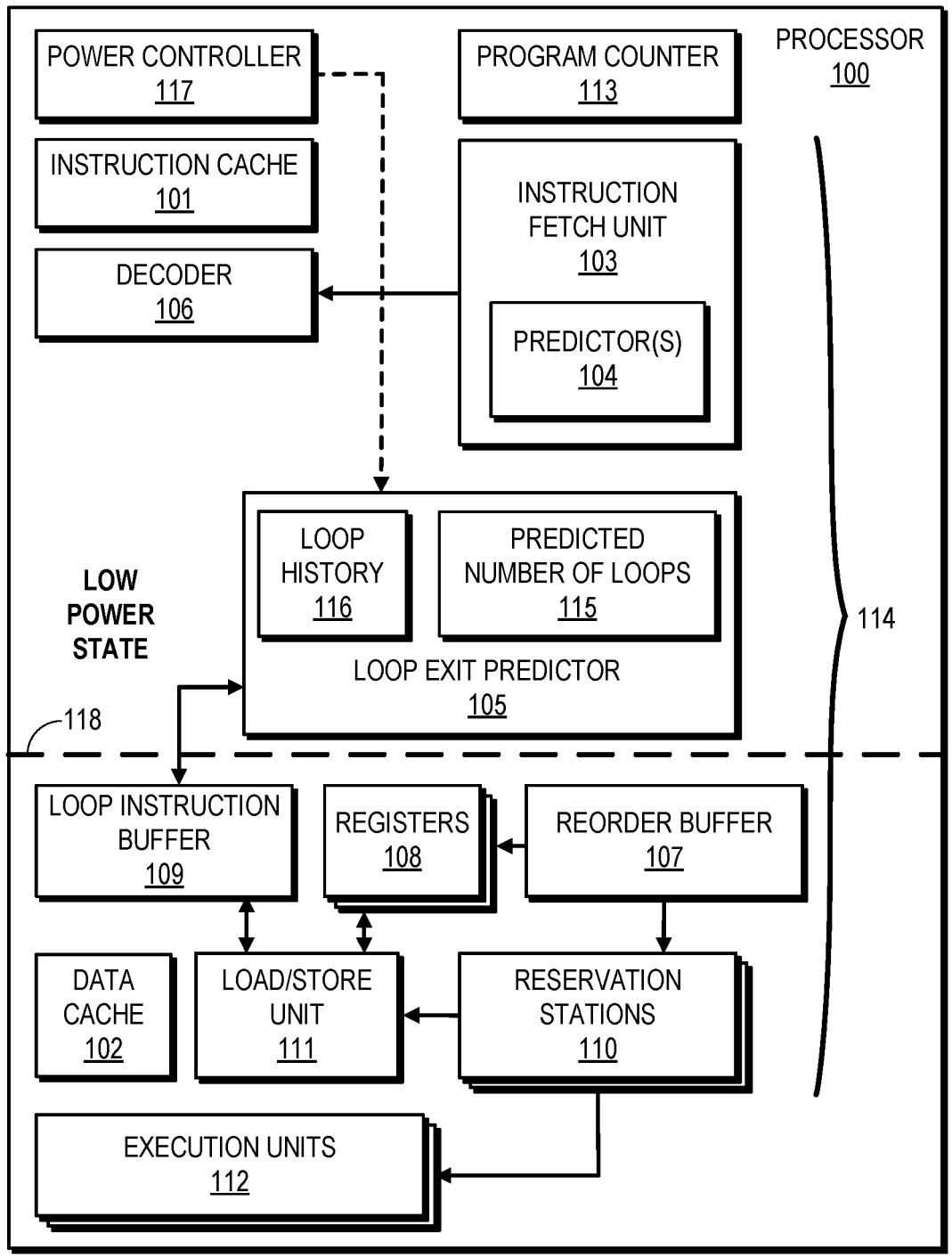
FIG. 1 is a block diagram of an instruction pipeline within a processor implementing loop exit prediction in a low power state in a loop mode in accordance with some embodiments.

FIGS. 1-5 illustrate techniques for employing loop exit prediction (LEP) at a processor to conserve processor resources associated with employing a loop mode. The processor includes a LEP unit that predicts the exit of each executing loop. Based on the prediction by the LEP unit, the processor implements one or more loop management techniques, including declining to enter the loop mode for a relatively short loop, exiting the loop mode before an indication of a branch misprediction or encountering a branch misprediction, and accelerating entry into the loop mode for a relatively large loop. Each of these techniques reduces the amount of resources consumed by the processor to employ the loop mode, thereby enhancing processing efficiency.

To illustrate, in some embodiments, the processor employs the LEP unit to predict the number of iterations of each executing loop in a program flow. In response to the LEP unit indicating that the number of iterations for the loop is below a specified threshold number of loop iterations, the processor suppresses entry into the loop mode for the loop. The processor thereby avoids entering the loop mode when resource costs of entering the loop mode exceed resource savings from executing the loop in the loop mode.

In some embodiments, the processor employs the LEP unit while executing a loop in the loop mode to predict when the loop is expected to exit. In response to the LEP unit indicating a predicted loop exit, the processor initiates exiting of the loop mode such as fetching and filling an instruction pipeline with one or more next instructions to execute upon exiting the loop. The processor therefore does not wait for a branch misprediction to indicate the loop exit or trigger the loop exit, and thus this procedure avoids a pipeline flush that consumes processor resources and delays further instruction execution. LEP is used to predict loop exit branches even during the loop mode. In certain embodiments, a dedicated LEP unit within a processor performs LEP. Since LEP is specifically tuned for loop exit branches, LEP accuracy is higher than an accuracy of general branch prediction applied by one or more branch predictors during execution of loops.

The processor also uses the predicted number of iterations provided by the LEP unit to identify a relatively large loop, and the processor accelerates entry into the loop mode ahead of executing the large loop. In particular, the processor nominally enters the loop mode in response to a first threshold number of iterations of the loop being executed or likely to be executed before entering the loop mode to make sure that a loop is actually encountered and successfully completing loops through the set of loop instructions. However, in certain embodiments, in response to the predicted number of iterations exceeding a specified second threshold, the processor initiates the loop mode without waiting for the first threshold number of iterations of the loop to be executed, thereby conserving processor resources by entering the loop mode sooner than in other embodiments of use of the loop mode.

FIG. 1 is a block diagram of an instruction pipeline architecture within a processor 100 implementing LEP in accordance with some embodiments. Only a few components of the processor 100 are illustrated for sake of simplicity of illustration. Further, certain components of the processor 100 may be considered part of either a front side or a back side of the processor 100 as conventionally understood, for retrieving and executing instructions, respectively, but are not so designated herein as the techniques described herein are applicable to a plurality of types of processors having various components, architectures, instruction sets, modes of operation, and so forth. The processor 100 generally executes sets of instructions (e.g., computer programs) to carry out tasks on behalf of an electronic device. Accordingly, in some embodiments, the processor 100 is incorporated into an electronic device such as a desktop computer, laptop computer, server, smartphone, game console, household appliance, and the like.

To support execution of instructions, the processor 100 includes an instruction pipeline 114 including an instruction cache 101, a data cache 102, an instruction fetch unit 103 having one or more predictors 104, a loop exit predictor 105, a decoder 106, a reorder buffer 107, registers 108, a loop instruction buffer 109, reservation stations 110, a load/store unit 111, one or more execution units 112, and a power controller 117. The instruction pipeline 114 is operates in at least two modes: an active (non-loop) mode and a loop mode. In the active mode, the components of the processor 100 are provided with power for active execution of instructions. In the loop mode, the processor 100 places one or more components in a low-power state to conserve one or more resources including energy that would have been consumed in the active mode such as while loop instructions are repeatedly executed while certain components remain idle.

In the active mode, the instruction fetch unit retrieves instructions from the instruction cache 101 based on a value stored at a program counter 113. In some embodiments, the instruction fetch unit 103 also fetches instructions based on predictions generated by the predictors 104. The predictors 104 include branch predictors and loop predictors that identify branching instructions, generate branch target addresses, loop instructions, and perform other branch, loop, and prediction functions.

The instruction fetch unit 103 provides the fetched instructions to the decoder 106, which converts each instruction to one or more micro-operations (micro-ops). A dispatch stage (not shown) of the decoder 106 sends each micro-op to a corresponding one of the load/store unit 111 and execution units 112 for execution. The reorder buffer 107 manages the scheduling of execution of the micro-ops at the load/store unit 111 and the execution units 112. In addition, the reservation stations 110 manage access to the registers 108 by the load/store unit 111 and execution units 112. After execution of the corresponding micro-operations, each instruction is retired at a retire stage (not shown) of the instruction pipeline 114.

In the loop mode, the instruction pipeline 114 executes iterations of a loop using the loop instruction buffer 109. As used herein, a loop is a set of instructions that is repeatedly executed until a conditional branch terminating the loop is taken. For example, for some loops, the conditional branch instruction is a relative jump instruction that includes an offset that is added to the program counter 113 pointing to the conditional branch instruction. In some embodiments, in order to be identified as a loop, the instruction pipeline 114 identifies that the conditional branch instruction was taken a threshold number of times (e.g., 2, 3, 4, 5) in the most recent execution instance of the loop. An iteration of a loop refers to a single execution of the instructions of the loop.

Returning to the loop mode, in response to detecting an instruction loop (e.g., based on logic of the predictors 104 indicating an instruction loop), the instruction pipeline 114 stores one or more of the micro-ops for the instructions of the loop in the loop instruction buffer 109. In the loop mode, the loop instruction buffer 109 repeatedly provides the micro-operations to the load/store unit 111 and the execution units 112 for execution until the loop exit is reached. Thus, in the loop mode, the instruction fetch unit 103 suspends retrieving instructions from the instruction cache 101. When in the loop mode, certain components of the processor 100 including one or more of the components of the instruction pipeline 114 are placed in a low-power mode or state by the power controller 117 to conserve power as illustrated by a dashed line 118. For example, the power controller 117 powers down the instruction fetch unit 103, one or more predictors 104, the loop exit predictor 105, and the decoder 106 while maintaining other components in an active state, such as the loop instruction buffer 109, the load/store unit 111, and the execution units 112. While in the active state, certain components remain powered on and perform their functions until a loop exit condition occurs and power is restored to those components that were placed in the low-power mode (e.g., before, during, or after entering loop mode).

To support efficient execution of the loop mode, the instruction pipeline 114 includes a loop exit predictor (LEP) 105 that predicts the number of iterations of each executed loop. To illustrate, the LEP 105 stores a loop history 116 that indicates patterns in loops executed at the instruction pipeline 114. In some embodiments, the LEP 105 generates and stores the loop history 116 during one or more dedicated training periods of the instruction pipeline 114. During each training period the instruction pipeline 114 executes specified sets of instructions, counts the number of iterations of each executed loop, and stores the number of iterations at a storage structure designated to predict the number of loops 115. In some embodiments, during normal operation of the processor 100, the instruction pipeline 114 continues to count iterations of each executed loop and based on the iterations adjusts the predicted number of loops 115.

In some embodiments, the LEP 105 supports efficient use of the loop mode in a number of ways. For example, for some loops have relatively few iterations, the resource cost of entering and exiting the loop mode exceeds the resource savings for using the loop mode. Accordingly, in some embodiments the instruction pipeline 114 employs the predictions of the LEP 105 to identify loops predicted to have relatively few iterations, and to avoid entering loop mode for those loops. Thus, in response to the predicted number of loops 115 for a loop being lower than a threshold, the instruction pipeline 114 prevents entry into the loop mode.

Further, for loops having a relatively high number of iterations, resource conservation is enhanced by entering the loop mode more quickly, such that more iterations of the loop are executed in the loop mode. Accordingly, in some embodiments, the instruction pipeline 114 employs the predictions of the LEP to identify loops predicted to have a relatively high number of iterations, and accelerates entry into the loop mode for those loops. Thus, in response to the predicted number of loops 115 for a loop being higher than a threshold (e.g., a first threshold), the instruction pipeline 114 enters the loop mode for the first iteration of the loop.

Figure 2:
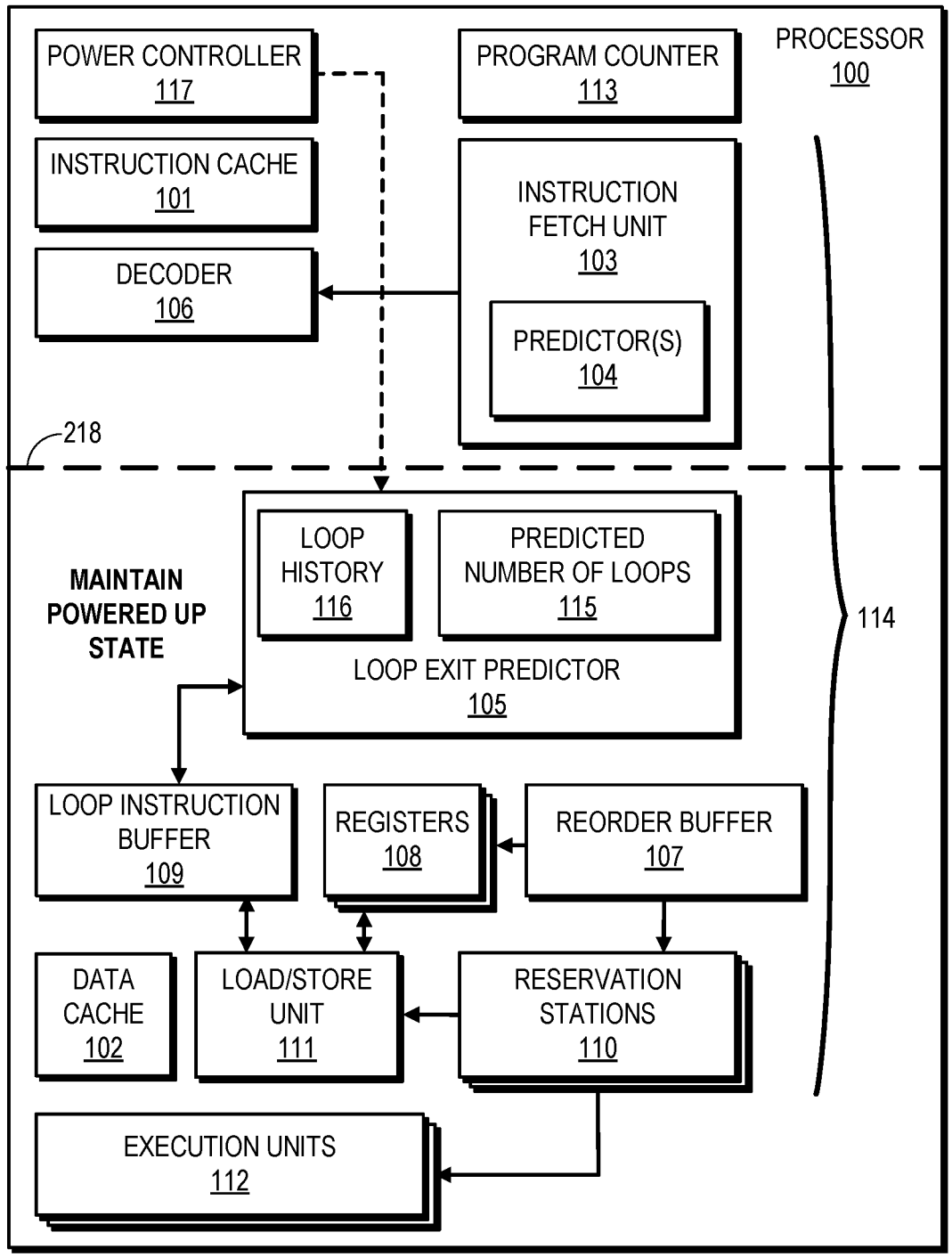
FIG. 2 is a block diagram of the instruction pipeline of FIG. 1 with a loop exit predictor in a powered up state during a loop mode in accordance with some embodiments.

In other embodiments, the instruction pipeline 114 uses the LEP 105 during the loop mode itself. This use can be better understood with reference to FIG. 2. FIG. 2 is a block diagram of an alternative configuration of the processor 100 whereby the instruction pipeline 114 maintains the loop exit predictor 105 in an active state during the loop mode (as illustrated by the placement of the LEP 105 relative to the dashed line 218) in accordance with some embodiments. When in the active state during the loop mode, the loop exit predictor 105 continues to predict the number of loop iterations. For example, the loop exit predictor 105 updates the predicted number of loop iterations likely to be performed by the loop being executed, and the loop exit predictor 105 updates a timing of restoring power to the components of the instruction pipeline 114 that were placed in the low-power mode based on the updated prediction so that the loop mode is exited prior to a branch misprediction that undesirably results in a pipeline flush which is both a performance and power overhead.

To illustrate, in a conventional processor, the end of a loop, and therefore the exiting of the loop mode, is indicated by a branch misprediction for the branch instruction that ends the loop. However, as with other mispredictions, the branch misprediction that indicates the end of the loop requires the instruction pipeline to be flushed and the pipeline returned to an earlier state. Thus, executing the loop until encountering a misprediction results in a power loss by way of a pipeline bubble whereby one or more downstream components such as the decoder 106, the reorder buffer 107, the registers 108, the reservation stations 110, the load/store unit 111, and the execution units 112 are starved for instructions. In contrast, the loop exit predictor 105 is maintained in the active state and predicts the exit to the loop. In response to the predicted exit, the instruction pipeline exits the loop mode by returning the instruction fetch unit 103 and other modules to an active state. The instruction pipeline 114 thereby avoids a branch misprediction for the loop exit and thus avoids a mispredict performance penalty.

Figure 3:
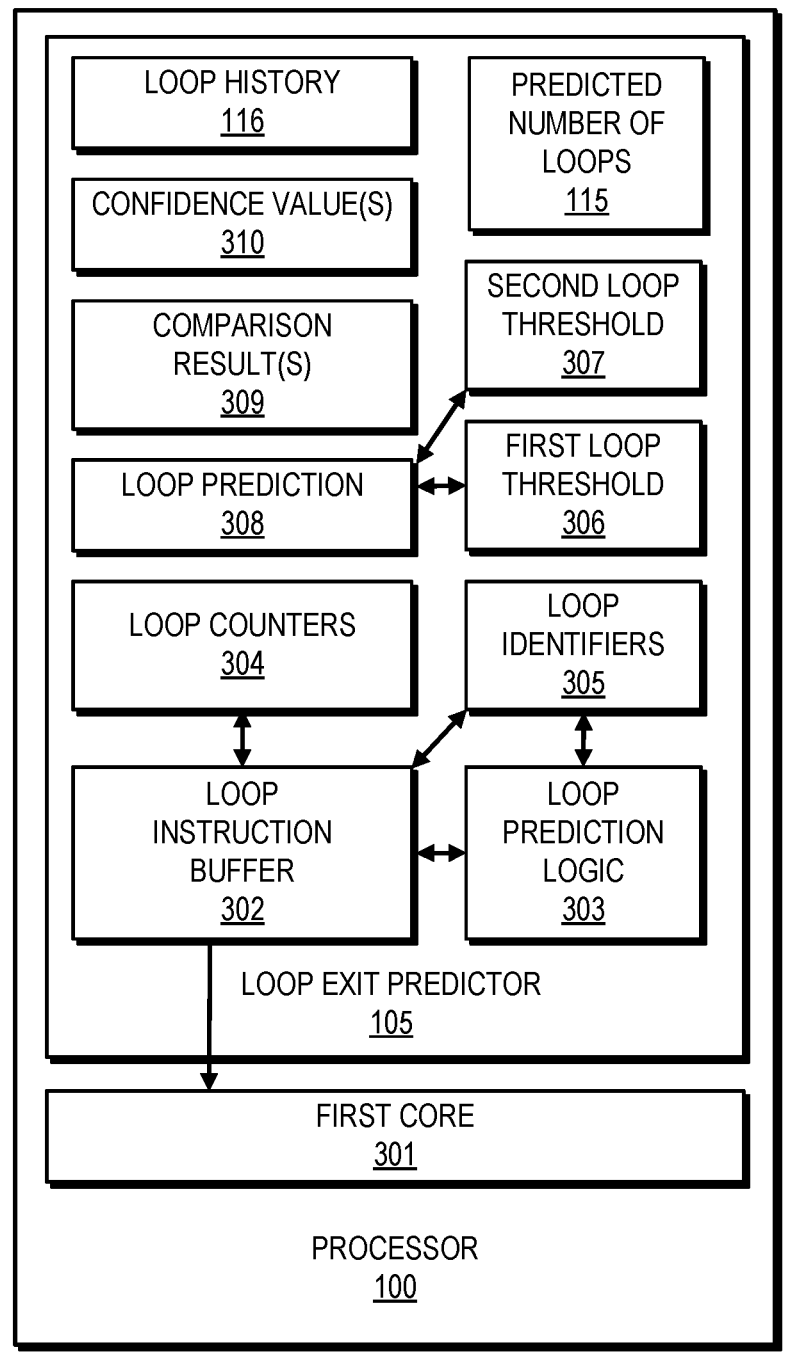
FIG. 3 is a block diagram of the instruction pipeline of FIG. 1 illustrating additional aspects of the loop exit predictor and a loop mode in accordance with some embodiments.

FIG. 3 is a block diagram of the processor 100 of FIG. 1 illustrating additional aspects of the LEP 105 in accordance with some embodiments. In addition to the predicted number of loops 115 and the loop history 116, the loop exit predictor 105 further includes: a loop instruction buffer 302, loop prediction logic 303, one or more loop counters 304, loop identifiers 305, a first loop threshold 306, a second loop threshold 307, a loop prediction 308, one or more comparison results 309, and one or more confidence values 310. The loop prediction logic 303 provides loop exit predictions based on a set of instructions that are identified as being executed repeatedly. A loop prediction 308 includes identifying and storing the predicted number of loops for a particular loop or set of one or more loop instructions. The loop counters 304 and the loop identifiers 305 are used by the loop exit predictor 105 and the instructions of the loop instruction buffer 302. For example, the loop counters 304 are used in training to identify when a set of instructions is executed as a loop, and used during loop execution to keep track of how many iterations of loop instructions have been completed. A respective loop counter 304 is compared against a predicted loop exit in preparing to exit the loop at a predicted loop exit count. One or more loops may be encountered when executing processor instructions and the processor 100 maintains a history of a plurality of executing loops in the loop history 116 such as when a second loop is executing inside of a first loop. The loop counters 304 include at least loop confidence values, and current, past, and predicted loop iteration values.

During a training phase, the loop exit predictor 105 detects the loop and the loop exit branch in the set of processor instructions. Training includes the loop exit predictor 105 keeping track of a number of loop iterations repeatedly executed for a particular set of loop instructions such as in one of the loop counters 304. Whenever a particular loop iterates a same number of times as in a previous run or execution instance of the loop, a confidence value 310 is incremented, and the confidence value 310 is used by the loop exit predictor 105 when providing its estimate of the loop exit.

At a time of identification or prediction, the loop exit predictor 105 searches for a matching loop identifier in a current set of the loop identifiers 305. A hit to an LEP entry in the loop identifiers 305 implies that a predicted branch instruction is an exit branch instruction. Finding the hit in the loop identifiers 305 includes matching a characteristic of a loop instruction to at least one identifier in the loop identifiers. If a current iteration of the particular loop being tracked by the loop exit predictor 105 is equal to a total number of iterations predicted by loop exit predictor 105, then the particular loop is predicted to exit during this iteration. That is, the particular loop iteration of the loop exit branch is predicted as not-taken. Otherwise, the loop exit branch is predicted to be taken.

According to certain embodiments, LEP performed by the loop exit predictor 105 is only performed when a confidence value 310 associated with the particular branch is sufficiently high. If the confidence value 310 is too low (i.e., fails to exceed a confidence threshold) or if there is no hit to an LEP entry in the loop identifiers 305, then the branch is predicted or subjected to processing by other branch predictors such as one of the predictors 104 of the instruction fetch unit 103. Since the loop prediction logic 303 is specifically tuned for loop exit branches, its prediction accuracy is usually higher than an accuracy of other branch predictors or general type predictors when the processor 100 executes instructions of exit branches. The loop prediction logic 303 provides the loop prediction 308 for each loop. The loop prediction 308 indicates whether a set of executing instructions is indeed a set of loop instructions. The loop exit predictor 105 provides the predicted number of loops: a number of iterations that the set of loop instructions is likely to complete before exiting.

According to certain embodiments, entering the loop mode is triggered by saturating a specified number of bits of a direction history of the conditional branches (not shown) to ensure that a loop (e.g., a set of one or more instructions) is actually being executed by the processor 100. For example, a loop is identified by finding a repetitive pattern along a direction in a history register. For a direction history register that is 100 bits, if a group of five bits out of the 100 bits is repeating, then that implies that there is a loop with five conditional branches. In operation, the loop mode is entered only after saturating a certain number of bits of the direction history register or exceeding a direction threshold (value). For a saturation level of 80 bits to saturate, and a loop that has only two conditional branches, a system would have to wait 40 iterations of the loop because only at that point would have a direction history variable (e.g., dirHist) become saturated (reach 80 counted bits) thereby triggering entrance of the loop mode. On the other hand, if the number of bits to saturate is too low (e.g., 10), then the system would have entered the loop mode right after a fifth iteration to reach the value of 10 by incrementing saturation by two bits for each loop iteration. If the particular loop in this situation is only supposed to run (or predicted to run) for six iterations, then the processor would enter the loop mode and then immediately come out of loop mode thereby wasting the benefits provided by the loop mode. Generally, if the number of bits of the direction history is greater than the direction threshold, then the processor 100 is identified as executing a loop. The larger the direction threshold, the longer it takes the processor 100 to be triggered into entering the loop mode and the lower a chance to identify an opportunity to save power by entering the loop mode when the instructions are actually loop instructions. If the direction threshold is too low, the processor 100 could enter the loop mode when no loop or an excessively short loop is actually being executed. Hence, there is a balancing as to when to enter the loop mode in view of the length of the loop being executed. In at least some embodiments, branch prediction includes a branch direction, a direction threshold, and a target address. The same is true for LEP such that LEP includes a loop direction, a loop threshold, and a loop exit target address.

The processor 100 also uses the loop prediction 308 before and during execution of micro-ops to determine when to enter the loop mode and to exit the loop mode. In particular, once the processor 100 has determined that the micro-ops are likely executing a loop, the loop prediction 308 is compared against the first loop threshold 306 and the second loop threshold 307. The comparisons yield a respective comparison result 309, one result per comparison. Based on at least one of the comparison results 309, the processor 100, enters the loop mode.

When an application (e.g., software application as a source of micro-ops for the processor 100) is going through a repetitive loop, micro-ops of the instructions (or instructions) pertaining to that loop are cached in the loop instruction buffer 302 before or during the loop mode. During the loop mode, the micro-ops are executed out of the loop instruction buffer 302 by one or more cores such as the first processor core 301, and certain other components of the processor 100 are placed in a low-power mode thereby saving power that would have been consumed by operation of the components operating at full power. For a set of loop instructions that is too large to fit in the loop instruction buffer 302, the loop exit predictor 105 remains powered up, and the loop instruction buffer 302 is powered down to a low-power or lower-power state, and energy consumption by the processor 100 remains a result of the loop mode. In this situation, the loop exit predictor 105 remains powered up and continues to predict the exit of the loop and a direction of the loop instructions when the instructions are pulled from the instruction cache 101 and provided to the first processor core 301. According to at least some embodiments, the loop mode occurs when one or more components are powered down or placed into a low-power mode and while loop instructions are executed such as from the loop instruction buffer 302.

When the predictors 104 are powered down or placed into a low-power mode in the loop mode, one way to exit the loop mode is to have an instruction execution component send a redirect message, an exit signal, indicating that the exit branch was mispredicted to one or more components of the processor 100. The exit signal causes the instruction pipeline 114 to fetch and execute instructions that occur after the loop. Because branch mispredicts are expensive in terms of wasted power and wasted execution cycles, an improperly selected or designated direction threshold comes with a power performance overhead. Hence, there is a trade-off to be made in terms of obtaining a power savings by entering the loop mode versus a power performance overhead for mispredicting the exit branch instruction. For short loops (e.g., loops less than 5 iterations, loops less than 10 iterations), in some situations the power performance overhead of the mispredicted exit branch outweighs the power savings in the loop mode for a particular configuration of the processor 100. Another way to exit the loop mode involves the loop exit predictor 105 remaining powered up and the loop exit predictor 105 providing the loop exit signal upon successful loop exit prediction. In this way, a mispredict is avoided by having the instruction pipeline 114 timely deliver for execution instructions occurring after the loop.

Figure 4:
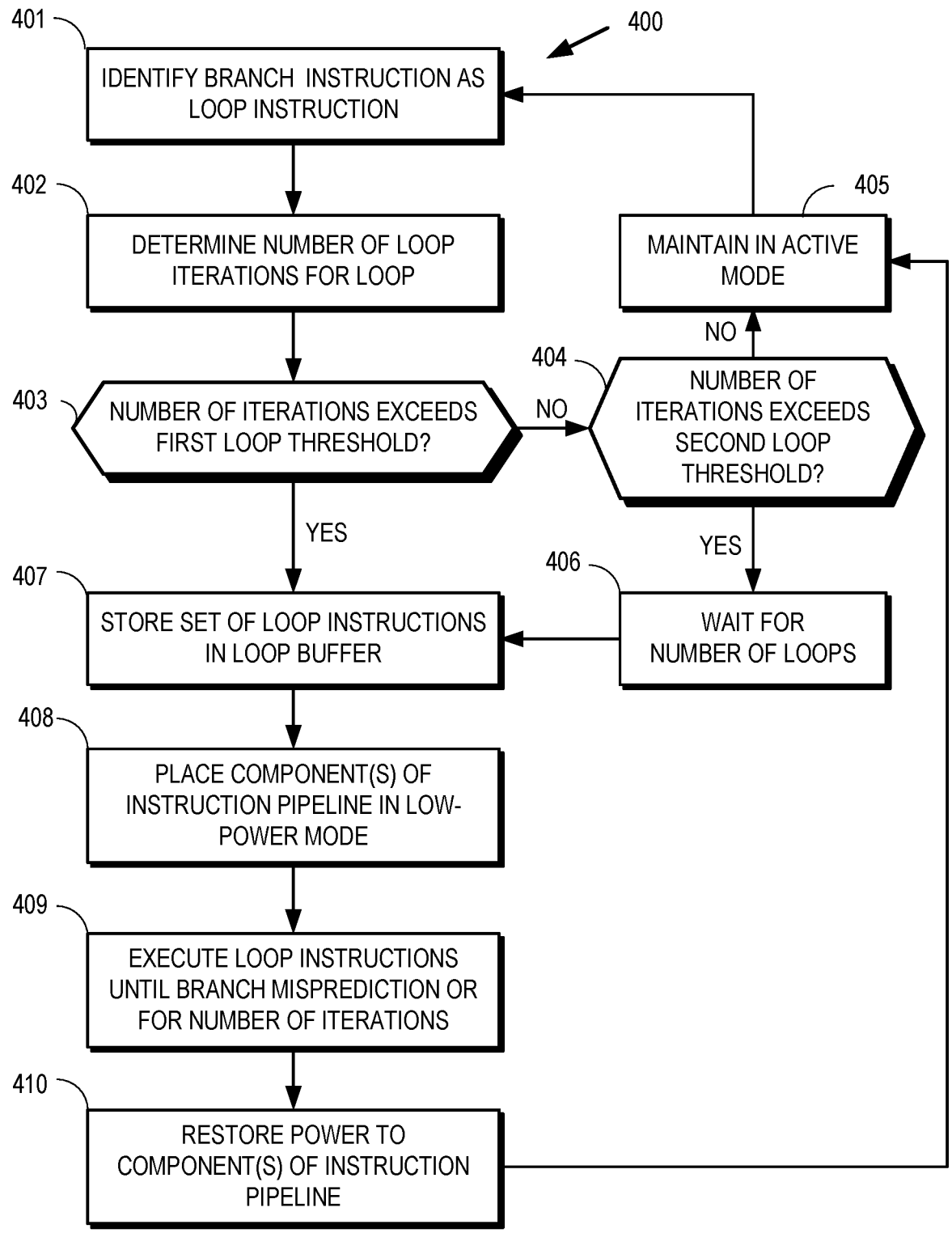
FIG. 4 is a flow diagram illustrating a method of employing loop exit prediction to identify relatively large loop iterations for a loop mode in accordance with some embodiments.

FIG. 4 is a flow diagram illustrating a method 400 for implementing loop exit prediction for a relatively large loop iteration prediction in accordance with some embodiments. The method 400 is performed by components of a processor such as the components of the processor 100. At block 401, the method 400 includes identifying whether a branch instruction is a loop instruction—a loop to potentially be executed in the loop mode. If so, at block 402, the processor determines a loop identifier and a number of loop iterations for the loop. This identification includes looking up the loop identifier in a set of stored loop identifiers such as the loop identifiers 305. At block 403, the processor determines whether the determined number of loop iterations exceeds a first loop threshold such as the first loop threshold 306. For example, the first loop threshold is a relatively large number (e.g., 500; 1,000; 10,000) for use in identifying a loop as a large loop having a relatively large number of predicted loop iterations to be executed by the processor. If the determined number of loop iterations exceeds the first loop threshold, the loop mode is directly entered. Further, according to some embodiments, if the first loop threshold is exceeded, no check is made whether a certain direction history threshold or direction history variable is exceeded: the loop mode is directly entered without making this check.

If the determined number of loop iterations does not exceed the first loop threshold, at block 404, the processor determines whether the determined number of loop iterations exceeds a second loop threshold such as the second loop threshold 307. For example, the second loop threshold is a relatively small number (e.g., 15, 10, 5, 3) for use in identifying a loop as a small loop having a relatively few number of predicted loop iterations to be executed by the processor. If the predicted number of loop iterations does not exceed the second threshold, at block 405, the processor waits for identification of a next loop by maintaining one or more components of an instruction pipeline in an active mode including maintaining the components in a powered up state, and execution returns to block 401. In this situation, the processor and loop exit predictor have encountered a loop that is likely too small to benefit from power savings of the loop mode and the processor avoids entering the loop mode based on the determination relative to the first loop threshold and the second loop threshold. Alternatively, the processor avoids entering the loop mode based on the determination relative to the second loop threshold.

If the determined number of loop iterations does not exceed the first loop threshold and exceeds the second threshold, at block 406, the processor waits for a certain number of actual loop iterations before confirming that the instructions are executing within the loop. If the determined number of loop iterations exceeds the first threshold at block 403—or after waiting the certain number of successful loop executions at block 406—the method 400 continues at block 407 at which a set of loop instructions are stored in a loop buffer, such as the loop buffer 109. Subsequently, the loop instructions are repeatedly executed from the loop buffer. At block 408, one or more components of the processor are placed in a low power mode. At block 409, the loop instructions are executed until a branch misprediction occurs or the loop instructions are executed for the number of predicted loop iterations and exited by having the loop exit predictor accurately predict the loop exit and provide the loop exit signal. In this situation, no pipeline bubble is encountered by the processor. Upon exiting the loop, at block 410, power is restored to the processor components that were placed in the low-power mode during the loop mode at block 408. Once power is restored, the processor waits for a next loop at block 405.

Figure 5:
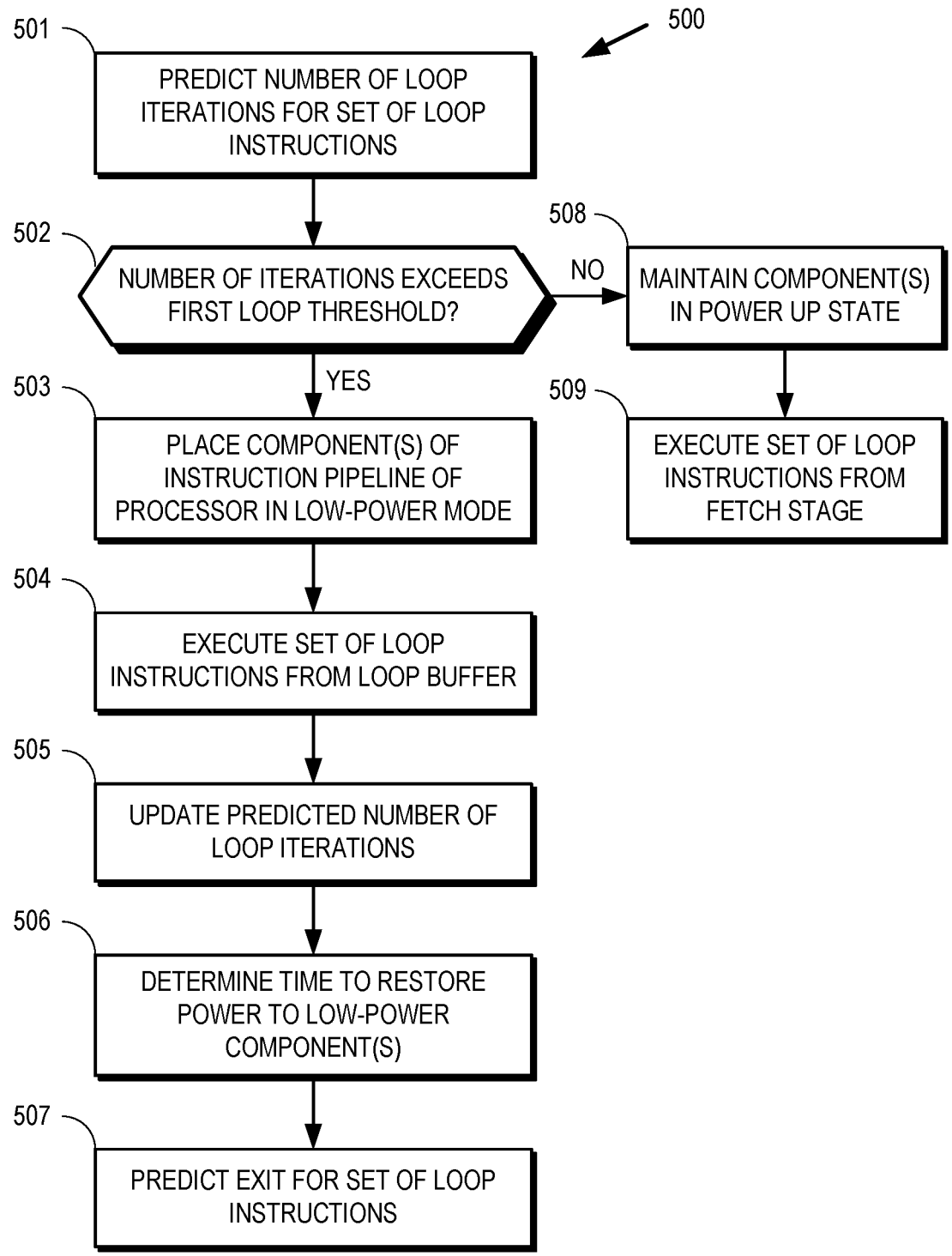
FIG. 5 is a flow diagram illustrating a method of employing loop exit prediction to identify small loop iterations for a loop mode in accordance with some embodiments.

FIG. 5 is a flow diagram illustrating a method 500 for implementing loop exit prediction for a relatively small loop iteration prediction in accordance with some embodiments. The method 500 is performed by components of a processor such as the processor 100. At block 501, the method 500 includes predicting a number of loop iterations associated with a set of loop instructions. In response to the predicted number of loop iterations exceeding a first loop iteration threshold at block 502, the set of loop instructions are executed in a loop mode and, in response to the predicted number of loop iterations failing to exceed the first loop iteration threshold (e.g., the predicted number of loop iterations is less than or equal to the loop iteration threshold), the set of instructions are operated in an active mode. In particular, for a positive outcome at block 502, at block 503 the loop mode includes placing at least one component of an instruction pipeline of the processor into a low-power mode or state. Further, according to some embodiments, at block 503, no check is made whether a certain direction history threshold or direction history variable is exceeded: the loop mode is entered directly upon determining that the predicted number of loop iterations exceeds the first loop iteration threshold. At block 504, the loop mode also includes executing the set of loop instructions from a loop buffer.

At blocks 505-507, the loop mode includes certain additional steps in accordance with some embodiments of the method 500. For example, at block 505, the loop mode updates the predicted number of loop iterations associated with the set of loop instructions. The predicting and the updating of the number of loop iterations is performed by a loop exit predictor such as the loop exit predictor 105. At block 506, the loop mode determines a time to restore power to the components of the instruction pipeline of the processor that were placed in the low-power mode. The time to restore power to the low-powered components is able to come before an end of execution of the loop instructions since a lead time (e.g., a certain number of clock cycles) is often needed to fill the instruction pipeline with instructions that come sequentially after exiting the loop to avoid a pipeline bubble. At block 507, the loop mode predicts an exit for the set of loop instructions. The processor determines the time to restore power to the components placed in the low-power mode and determines a next instruction address based on the predicted exit.

At block 508, the active mode of the method 500 includes maintaining the at least one component of the instruction pipeline in a powered up state. For example, a loop exit predictor such as loop exit predictor 105 is maintained with power. At block 509, the active mode also executes the set of loop instructions from an instruction fetch stage unit of the instruction pipeline. For the method 500, for each loop, the processor is operating either in the loop mode or in the active mode.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities, components, or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processor comprising:
    an instruction cache having a set of loop instructions for the processor;
    a loop exit predictor configured to predict a number of loop iterations expected to be executed for a loop associated with the set of loop instructions, and to predict a loop exit;
    a power controller configured to place a component of an instruction pipeline of the processor in a low-power mode in response to the loop exit predictor predicting the number of loop iterations; and
    one or more cores configured to execute the set of loop instructions in response to the loop exit predictor predicting the number of loop iterations, wherein the power controller is further configured to restore power to the component placed in the low-power mode based on the predicted loop exit.

2. The processor of claim 1, further comprising:
    a decoder configured to decode the set of loop instructions into micro-operations for execution by a functional unit of the processor.

3. The processor of claim 2, further comprising:
    an instruction fetch unit configured to provide the set of loop instructions to the decoder from the instruction cache.

4. The processor of claim 3, wherein the instruction fetch unit is configured to provide loop instructions to the loop exit predictor.

5. The processor of claim 3, wherein the instruction fetch unit is configured to suspend
    suspend fetching of instructions from the instruction cache during execution of the set of loop instructions.

6. The processor of claim 1, wherein the power controller is further configured to:
compare the predicted number of loop iterations with a loop iteration threshold prior to powering down the component of the instruction pipeline.

7. The processor of claim 1, wherein the power controller is configured to place the component of the instruction pipeline in the low-power mode prior to the one or more cores executing the set of loop instructions.

8. The processor of claim 1, wherein the power controller is further configured to:
power down the loop exit predictor based on powering power down the component of the instruction pipeline.

9. The processor of claim 1, wherein the power controller is further configured to:
maintain at least one of a loop buffer, a load/store unit, or one or more execution units in an active state while the component of the instruction pipeline is in the low-power mode.

10. The processor of claim 1, wherein the loop exit predictor is configured to predict the number of loop iterations based on historical loop data indicating patterns in loops executed at the instruction pipeline.

11. A processor comprising:
an instruction cache having a set of loop instructions for the processor;
a loop exit predictor configured to predict a number of loop iterations expected to be executed for a loop associated with the set of loop instructions;
one or more cores configured to execute the set of loop instruction in one of a loop mode or a non-loop mode; and
a power controller configured to place at least one component of an instruction pipeline of the processor in a low-power mode during the loop mode and maintain the at least one component of the instruction pipeline in an active state during the non-loop mode.

12. The processor of claim 11, wherein the one or more cores are further configured to execute the set of loop instructions fetched from the instruction cache by an instruction fetch unit of the instruction pipeline during the non-loop mode.

13. The processor of claim 11, further comprising:
a decoder configured to decode the set of loop instructions into micro-operations for execution by a functional unit of the processor; and
an instruction fetch unit configured to provide the set of loop instructions to the decoder from the instruction cache.

14. The processor of claim 13, wherein the instruction fetch unit is configured to provide loop instructions to the loop exit predictor.

15. The processor of claim 11, wherein the loop exit predictor is further configured to:
update the number of loop iterations associated with the set of loop instructions after the power controller places the at least one component of the instruction pipeline in the low-power mode; and
wherein a timing of restoring power to the at least one component of the instruction pipeline placed in the low-power mode is based on the updated number of loop iterations.

16. The processor of claim 11, further comprising:
a buffer of stored loop identifiers; and
wherein the loop exit predictor is further configured to:
match a characteristic of the set of loop instructions to an identifier in the buffer of stored loop identifiers.

17. The processor of claim 11, wherein the loop exit predictor is configured to predict the number of loop iterations based on historical loop data indicating patterns in loops executed at the instruction pipeline.

18. The processor of claim 11, wherein the power controller is configured to place the at least one component of the instruction pipeline in the low-power mode prior to the one or more cores executing any instruction associated with the set of loop instructions and after the loop exit predictor predicts the number of loop iterations associated with the set of loop instructions.

19. The processor of claim 11, wherein the power controller is further configured to:
maintain at least one of a loop buffer, a load/store unit, or one or more execution units in active state while at least one component of an instruction pipeline is in the low-power mode.

20. A method comprising:
in a processor, predicting a number of loop iterations expected to be executed for a loop associated with a set of loop instructions;
executing the set of loop instructions in one of a loop mode or a non-loop mode; and
placing at least one component of an instruction pipeline of the processor in a low-power mode during the loop mode; and
maintaining the at least one component of the instruction pipeline in an active state during the non-loop mode.

* * * * *

UNITED STATES PATENT AND TRADEMARK OFFICE
CERTIFICATE OF CORRECTION

PATENT NO. : 11,256,505 B2
APPLICATION NO. : 17/169053
DATED : February 22, 2022
INVENTOR(S) : Arunachalam Annamalai et al.

It is certified that error appears in the above-identified patent and that said Letters Patent is hereby corrected as shown below:

In the Claims

At Column 12 Line 35, please insert --an-- after "in" and before "active"

Signed and Sealed this
Twenty-eighth Day of February, 2023

Katherine Kelly Vidal
*Director of the United States Patent and Trademark Office*